United States Patent

Cobb et al.

[11] Patent Number: 6,100,320
[45] Date of Patent: Aug. 8, 2000

[54] PROCESS FOR MAKING THERMOPLASTIC PROFILES HAVING REDUCED MELT FRACTURE

[75] Inventors: Daniel Christopher Cobb; James Wilson Mercer, Jr., both of Kingsport, Tenn.

[73] Assignee: Eastman Chemical Company, Kingsport, Tenn.

[21] Appl. No.: 09/275,611

[22] Filed: Mar. 24, 1999

[51] Int. Cl.[7] .................................................. C08K 5/098
[52] U.S. Cl. ...................... 524/399; 524/601; 524/605; 264/328.17; 264/331.21; 264/221; 264/167
[58] Field of Search ................... 524/601, 605, 524/176, 399; 264/328.17, 331.21, 211, 167

[56] References Cited

U.S. PATENT DOCUMENTS

| | | | |
|---|---|---|---|
| 4,034,013 | 7/1977 | Lane | 524/513 |
| 4,436,860 | 3/1984 | Hepp . | |
| 4,925,890 | 5/1990 | Leung et al. . | |
| 5,091,457 | 2/1992 | Efner . | |
| 5,132,353 | 7/1992 | Wallace . | |
| 5,178,943 | 1/1993 | Asai et al. . | |
| 5,273,810 | 12/1993 | Nakano et al. . | |
| 5,913,999 | 6/1999 | Hayashida et al. | 156/272.2 |
| 5,914,191 | 6/1999 | Hanson et al. | 428/409 |

FOREIGN PATENT DOCUMENTS

| | | |
|---|---|---|
| 43 27 765 A1 | 3/1994 | Germany . |
| WO 94/07946 A1 | 4/1994 | WIPO . |

OTHER PUBLICATIONS

Mitsui Petrochemical Industries Company, Ltd., Japan Patent Application 2160861 (1990) (Derwent Abstract).

Sekisui Plastics Company, Ltd., Japan Patent Application 5230354 (1993) (Derwent Abstract).

H. Dallmann et al, Europe Patent Application 406727 (1991) (Derwent Abstract).

A. Ciaperoni et al, Belgium Patent Application 901419 (1985) (Derwent Abstract).

Japan Patent Application 59229314 (1984) assigned to Diafolil Company, Ltd. (Derwent Abstract).

Japan Patent 92021704 (1992) assigned to Mitsubishi Chemical Industries Ltd. (Derwent Abstract).

M. Hashimoto et al., Japan Patent Application 01318063 (1989) (Derwent Abstract).

*Primary Examiner*—Robert Dawson
*Assistant Examiner*—Kuo-Liang Peng
*Attorney, Agent, or Firm*—Cheryl J. Tubach; Harry J. Gwinnell

[57] ABSTRACT

In a process for producing a profile by profile extrusion of a thermoplastic resin, a melt of the thermoplastic resin is extruded through a die to form the profile. The process is improved by utilizing a thermoplastic resin having a composition of from about 99.95 to about 98.0 weight percent amorphous or semicrystalline polyester and from about 0.05 to about 2.0 weight percent of a zinc salt of an organic acid. The improvement of the process is either by increasing speed or decreasing temperature of a profile extrusion process already operating at a maximum speed and/or temperature with experiencing melt fracture. When melt fracture is present in the profile extrusion process, a method for reducing melt fracture in a profile is accomplished by combining from about 99.95 to about 98.0 weight percent amorphous or semicrystalline polyester and from about 0.05 to about 2.0 weight percent of a zinc salt of an organic acid to form a melt, extruding the melt through an orifice of a die at a temperature and a speed to form an extruded article having a shape, and thereafter quenching the extruded article to form a profile.

30 Claims, No Drawings

PROCESS FOR MAKING THERMOPLASTIC PROFILES HAVING REDUCED MELT FRACTURE

TECHNICAL FIELD OF THE INVENTION

This invention relates to profile extrusion of thermoplastic polymers to form shaped articles commonly referred to as profiles. More particularly, this invention relates to extrusion of polyesters to form profiles that have reduced melt fracture.

BACKGROUND OF THE INVENTION

Thermoplastic materials are commonly used to manufacture various shaped articles which may be utilized in applications such as automotive parts, food containers, signs, packaging materials and the like. One such article is a profile. Profiles are defined by having a particular shape and by their process of manufacture known as profile extrusion. A common shape of a profile is tubing. Profiles are not film or sheeting, and thus the process for making profiles does not include the use of calendering or chill rolls. Profiles are also not prepared by injection molding processes. Profiles are fabricated by melt extrusion processes that begin by extruding a thermoplastic melt through an orifice of a die forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. With extremely complex shapes, support means are often used to assist in shape retention. In either case, the type of thermoplastic resins utilized and its melt strength during formation is critical.

Polymers typically used for making profiles include poly (vinyl chloride) (PVC), acrylic polymers, and polycarbonate. Each of these polymers suffers from one or more disadvantages. For example, PVC is undesirable from an environmental standpoint. Acrylic objects are brittle and shatter when dropped or struck against another object. Polycarbonate is too expensive for many applications.

Polyesters have also been used for making profiles, however, severe processing problems exist due to inadequate melt strength at typical profile processing temperatures of 480–550° F. (250–290° C.). Processing line speeds vary considerably depending on the shape of the profile. Typical speeds for simple shapes like a corner guard may be from about 50 to about 70 feet per minute. More complicated shapes may have process line speeds as low as 1 foot per minute, whereas extremely simple shapes with certain types of processing technology may run at speeds as high as 100 feet per minute. At the higher speeds, which obviously would be preferred by profile manufacturers, inadequate melt strength produces an extrudate that does not maintain its shape prior to quenching, and thus deformation occurs. To increase the melt strength of the polyester, processing temperatures and speeds are lowered. By decreasing speed, the economic attractiveness of using polyesters is also decreased. Thus, the profile extrusion processes are often operated at maximum speeds associated with the highest temperatures and minimal melt strengths for maintaining particular profile shapes. Any increase in speed or lowering of temperature may cause an increase in high shear viscosity in the die, which then may cause an undesirable phenomenon known as melt fracture.

Melt fracture is a flow instability phenomenon occurring during extrusion of thermoplastic polymers at the fabrication surface/polymer melt boundary. The occurrence of melt fracture produces severe surface irregularities in the extrudate as it emerges from the orifice. The naked eye detects this as a frosty appearance or matte finish as opposed to an extrudate without melt fracture that appears clear. Solutions for reducing melt fracture include streamlining the flow channel geometry, increasing the cross-sectional area of the orifice, increasing resin temperatures, reducing processing speeds, reducing the melt viscosity of the resin, and utilizing an external lubricant.

Thus, there exists a need in art to have polyester compositions which can be made into profiles by having improved processing characteristics during their extrusion to significantly reduce melt fracture while not sacrificing melt strength and speed. Accordingly, it is to the provision of such that the present invention is primarily directed.

SUMMARY OF THE INVENTION

In a process for producing a profile by profile extrusion of a thermoplastic resin, a melt of the thermoplastic resin is extruded through a die to form the profile. The present invention is an improvement in this process in which a thermoplastic resin is a composition of from about 99.95 to about 98.0 weight percent amorphous or semicrystalline polyester and from about 0.05 to about 2.0 weight percent of a zinc salt of an organic acid.

In another embodiment of the invention, a method for reducing melt fracture in a profile formed by profile extrusion comprises the steps of (a) combining from about 99.95 to about 98.0 weight percent amorphous or semicrystalline polyester and from about 0.05 to about 2.0 weight percent of a zinc salt of an organic acid to form a melt, (b) extruding the melt through an orifice of a die at a temperature and a speed to form an extruded article having a shape, and (c) thereafter quenching the extruded article to form a profile. The profile has a reduction in melt fracture as compared to a second profile made from a second melt comprising the polyester without the zinc salt of an organic acid and extruded through the orifice at the same temperature and same speed.

DETAILED DESCRIPTION OF THE INVENTION

Particular resin compositions comprising from about 99.95 to about 98.0 weight percent amorphous or semicrystalline polyester and from about 0.05 to about 2.0 weight percent of a zinc salt of an organic acid are useful in making profiles by profile extrusion processes. These resin compositions may be easily extruded into tubing and a wide range of other profiles at similar temperatures and speeds of traditional polymers used in the profile extrusion industry; thus, making the polyesters of the present invention an economic alternative to such traditional polymers. In a profile extrusion process that does not have problems with melt fracture, the presence of the zinc salt of an organic acid either allows for an increase in processing speeds or decrease in the temperature of the polyester melt. In a profile extrusion process that does have existing problems of melt fracture, the presence of the zinc salt of an organic acid reduces the occurrence of melt fracture.

The present invention relates to improving a process for producing a profile by profile extrusion of a thermoplastic resin wherein a melt of the thermoplastic resin is extruded through a die to form the profile. The improvement of the process is in using as the thermoplastic resin a composition comprising from about 99.95 to about 98.0 weight percent amorphous or semicrystalline polyester and from about 0.05 to about 2.0 weight percent of a zinc salt of an organic acid. Preferably, the polyester is present from about 99.95 to about 99.5 weight percent and more preferably from about 99.9 to about 99.5 weight percent. Preferably the zinc salt of an organic acid is present from about 0.05 to about 1.0 weight percent and more preferably from about 0.1 to about 0.5 weight percent.

Process improvements are economically realized by the increase in speed of the profile extrusion process caused by the addition of the zinc salt of an organic acid. For processes that are operating at their maximum speed for a particular profile without the occurrence of melt fraction in the profile, the addition of the zinc salt of an organic acid allows for an increase in speed of preferably 5 percent, more preferably 10 percent and even more preferably 20 percent. As an alternative improvement to a process which does not have melt fracture, the temperature of the melt upon exiting the die may also be reduced by preferably 5 percent, more preferably 10 percent and even more preferably 20 percent. The temperature of the polyester melt upon exiting the die ranges from about 385° F. (195° C.) to about 500° F. (260° C.), preferably from about 420° F. (215° C.) to about 480° F. (249° C.), without the occurrence of melt fracture in the profile.

The amorphous or semicrystalline polyester of the present invention preferably comprises a diacid component comprising residues of terephthalic acid, naphthalenedicarboxylic acid, 1,4-cyclohexane-dicarboxylic acid, isophthalic acid or mixtures thereof and a glycol component comprising residues of ethylene glycol, 1,4-butanediol, 1,4-cyclohexanedimethanol, diethylene glycol, polytetramethylene glycol, neopentyl glycol and mixtures thereof. The polyester may be a homopolymer or a copolymer. The polyester copolymer preferably comprises a diacid component comprising residues of at least 80 mole percent terephthalic acid and a glycol component comprising residues of either (1) from 97 to about 5 mole percent ethylene glycol and from about 3 to about 95 mole percent 1,4-cyclohexanedimethanol or (2) from about 50 to about 85 mole percent ethylene glycol and from about 50 to about 15 mole percent neopentyl glycol. Another preferred copolymer comprises a diacid component comprising residues of from about 98 to about 70 mole percent terephthalic acid and from about 2 to about 30 mole percent isophthalic acid and a glycol component comprising residues of at least 80 mole percent ethylene glycol. Highly useful polyesters include copolyesters containing from about 12 to about 60 mole percent 1,4-cyclohexane-dimethanol. The 1,4-cyclohexanedimethanol and 1,4-cyclohexane-dicarboxylic acids may be in the cis or trans form or as mixtures of isomers. Naphthalenedicarboxylic acid may be present as any of the isomeric forms or mixtures of isomers but the 2,6-, 2,7-, 1,4-, and 1,5-isomers are preferred.

Small amounts of up to about 20 mole percent of other modifying acids and glycols may be used. Modifying dibasic acids include those containing from about 4 to about 40 carbon atoms such as succinic, glutaric, adipic, sebacic, dimer, suberic and the like acids. Modifying glycols include those containing 3 to about 10 carbon atoms such as 1,3-propanediol, propylene glycol, 1,5-pentanediol, 1,6-hexanediol, 2,2,4-trimethyl-1,3-pentanediol, 2,2,4,4-tetramethyl-1,3-cyclobutanediol and the like.

The inherent viscosity (I.V.) values of the polymers will generally be in the 0.4 dL/g to 1.5 dL/g range but those with values of about 0.5 dl/g to about 1.0 dL/g are preferred. Inherent viscosity (I.V.) as used herein refers to viscosity determinations made at 25° C. using 0.25 gram of polymer per 100 mL of a solvent composed of 60 weight percent phenol and 40 weight percent tetrachloroethane.

The zinc salts of organic acids used in the practice of this invention include those derived from carboxylic acids containing from about 8 to about 40 carbon atoms such as caprylic acid, 2-ethylhexanoic acid, pelargonic acid, capric acid, lauric acid, myristic acid, palmitic acid, arachidic acid, behenic acid, lignoceric acid, cerotic acid, and dimer acid. The zinc salts of organic acids also include those derived from unsaturated fatty acids containing from about 12 to about 22 carbon atoms such as oleic acid, ricinoleic acid, linoleic acid, linolenic acid, and erucic acid. The preferred salts are based on organic acids containing 12 to 22 carbon atoms. One salt or a mixture of salts may be used. The most preferred zinc salts of an organic acid salt are zinc stearate, zinc laurate, and zinc oleate.

The zinc salt of an organic acid may be mixed with the polyester in a wide range of melt processing equipment such as Banbury mixers or extruders. Either single screw or twin screw extruders may be used. A preferred process of adding the zinc salt to the polyester is to make a master batch of the zinc salt of an organic acid in a polymer base material such as a polyester or a polyolefin. Suitable polyolefins include polypropylene and low density, linear low density, or high density polyethylenes. The master batch is let down during the extrusion operation in the desired polyester. The concentration of zinc salt in the master batch may range from about 3 to about 50 weight percent, but preferably about 5 to about 30 weight percent.

The blends of this invention are readily processed into tubing or a variety of profile shapes including T, U, V, triangle shapes or even more complicated shapes. The profile is preferably optically clear.

In addition to the zinc salt, other additives normally used with polyesters may be used if desired. Such additives include stabilizers, antioxidants, dyes, pigments, colorants, lubricants, fillers, flame retardants and the like.

Another embodiment of the present invention sets forth a method for reducing melt fracture in a profile formed by profile extrusion. In the method from about 99.95 to about 98.0 weight percent amorphous or semicrystalline polyester is combined with from about 0.05 to about 2.0 weight percent of a zinc salt of an organic acid to form a melt. The melt is extruded through an orifice of a die at a temperature and a speed to form an extruded article having a shape. The extruded article is thereafter quenched to form a profile. The profile produced from the method has a reduction in melt fracture as compared to a second profile made from a second melt and extruded through the same orifice at the same temperature and speed. The second melt comprises the same amorphous or semicrystalline polyester without the addition of the zinc salt of an organic acid.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Melt fracture (Comparative/Neat Polyester)

Dried pellets of a copolyester, which contains a diacid component of 100 mole % terephthalic acid and a glycol component of 69 mole % ethylene glycol and 31 mole % 1,4-cyclohexanedimethanol (CHDM) and has an inherent viscosity (IV) of 0.76 dL/g, are extruded on a Davis Standard DS-25 extruder with a standard barrier screw (diameter to length ratio of 24 to 1) to a ¾ inch corner guard with a wall thickness of 0.030 inches at the following conditions:

| | |
|---|---|
| Zone 1 = 420° F. | Head Pressure = 900 psi |
| Zone 2 = 420° F. | Load = 34.5 Amps |
| Zone 3 = 430° F. | Screw Speed = 13.8 RPM |
| Clamp = 455° F. | Line Speed = 60 ft/min |
| Orifice = 455° F. | Appearance = frosted, matte finish |
| Melt Stream = 447° F. | Melt Fracture = yes |

A visual process for determining melt fracture was used wherein the human eye at zero magnification under normal interior lighting conditions observed the condition of the extruded part. The extruded part had a frosted appearance or matte finish indicating considerable melt fracture had occurred during extrusion. An extruded part being clear indicates no melt fracture is present.

Example 2
No Melt Fracture (Zinc Stearate Additive)

Dried pellets of the copolyester of Example 1 (24.5 lbs) were mixed with a master batch (0.5 lbs) containing 90 weight % of the copolyester of Example 1 and 10 weight % zinc stearate. This blend was extruded into a ¾ inch corner guard profile as described in Example 1 under the following conditions:

| | |
|---|---|
| Zone 1 = 420° F. | Head Pressure = 600 psi |
| Zone 2 = 420° F. | Load = 22.2 Amps |
| Zone 3 = 430° F. | Screw Speed = 15.7 RPM |
| Clamp = 455° F. | Line Speed = 60 ft/min |
| Orifice = 455° F. | Appearance = clear |
| Melt Stream = 447° F. | Melt Fracture = no |

This extruded profile was clear and had an excellent overall appearance. Thus, this melt extrusion composition which contained 0.2 weight % zinc stearate showed no evidence of melt fracture.

Example 3
Melt Fracture (Comparative/Other Additives)

Dried pellets of the copolyester of Example 1 (24.5 lbs) were mixed with a master batch (0.5 lbs) containing 90 weight % of the copolyester of Example 1 and 10 weight % calcium stearate. This blend was extruded into a ¾ inch corner guard profile as described in Example 2. This extruded part had a frosted appearance or matte finish. Thus, the presence of the calcium stearate does not remove the melt fracture problem.

In a similar manner, 0.2 weight % concentrations of stearic acid, mineral oil, and pentaerythritol tetrastearate were used as described in Example 2. None of these additives eliminated the melt fracture problem.

Example 4
No Melt Fracture

Using the procedure of Example 2, a copolyester containing a diacid component of 100 mole % terephthalic acid and a glycol component of 96.5 mole % ethylene glycol and 3.5 mole % CHDM was blended with additional copolyester of Example 1 containing 10 weight % zinc laurate to provide a melt extrusion composition containing 0.2 weight % zinc laurate. This composition was extruded into a clear, ¾ inch, corner guard profile. No melt fracture was present to the human eye.

Similarly good results were achieved using zinc oleate instead of the zinc laurate.

Example 5
No Melt Fracture

Using the procedure of Example 2, a copolyester comprising a diacid component of 80 mole % terephthalic acid and 20 mole % 2,6-naphthalenedicarboxylic acid and a glycol component of 80 mole % ethylene glycol and 20 mole % CHDM was mixed with the zinc stearate master batch of Example 2 to provide a composition containing 0.2 weight % zinc stearate. This blend was extruded into a clear ¾ inch corner guard profile. No melt fracture was present to the human eye.

The reduction in melt fracture of profiles as a result of the present invention solves a much need problem in the thermoplastic extrusion industry. By addition of the organic zinc salts to the amorphous or semicrystalline polyesters, an extruded article formed therefrom is able to be processed at lower temperatures and higher speeds while resulting in a profile that is clear.

We claim:

1. In a process for producing a profile by profile extrusion of a thermoplastic resin wherein a melt of said thermoplastic resin is extruded through a die to form said profile, the improvement comprising using as said thermoplastic resin a composition comprising from about 99.95 to about 98.0 weight percent amorphous or semicrystalline polyester and from about 0.05 to about 2.0 weight percent of a zinc salt of an organic acid.

2. The process of claim 1 wherein extruding through said die has a speed increase of at least 5 percent without causing melt fracture of said profile as compared to a speed of extruding through said die with a second melt of a second thermoplastic resin having a second composition of 100 weight percent of said amorphous or semicrystalline polyester and having process conditions other than speed the same as that of said first melt.

3. The process of claim 2 wherein a speed of producing said profile is increased by at least 10 percent without causing melt fracture of said profile.

4. The process of claim 3 wherein a speed of producing said profile is increased by at least 20 percent without causing melt fracture of said profile.

5. The process of claim 1 wherein said melt extruding through said die has a temperature decrease of at least 5 percent without causing melt fracture of said profile as compared to a temperature of a second melt extruding through said die, wherein said second melt has a second composition of 100 weight percent of said amorphous or semicrystalline polyester and having process conditions other than temperature the same as that of said first melt.

6. The process of claim 5 wherein a temperature of said melt upon exiting said die is decreased by at least 10 percent without causing melt fracture of said profile.

7. The process of claim 6 wherein a temperature of said melt upon exiting said die is decreased by at least 20 percent without causing melt fracture of said profile.

8. The process of claim 1 wherein said polyester comprises a diacid component comprising residues of terephthalic acid, naphthalene-dicarboxylic acid, 1,4-cyclohexanedicarboxylic acid, isophthalic acid or mixtures thereof and a glycol component comprising residues of ethylene glycol, 1,4-butanediol, 1,4-cyclohexanedimethanol, diethylene glycol, polytetramethylene glycol, neopentyl glycol and mixtures thereof.

9. The process of claim 1 wherein said polyester comprises a diacid component comprising residues of at least 80 mole percent terephthalic acid based on the total dicarboxylic acids and a glycol component comprising residues of from 97 to about 5 mole percent ethylene glycol and from about 3 to about 95 mole percent 1,4-cyclohexanedimethanol.

10. The process of claim 1 wherein said polyester comprises a diacid component comprising residues of at least 80 mole percent terephthalic acid based on the total dicarboxylic acids and a glycol component comprising residues of from about 50 to about 85 mole percent ethylene glycol and from about 50 to about 15 mole percent neopentyl glycol.

11. The process of claim 1 wherein said zinc salt of an organic acid is derived from carboxylic acids containing from about 8 to about 40 carbon atoms.

12. The process of claim 1 wherein said zinc salt of an organic acid is derived from unsaturated fatty acids containing from about 12 to about 22 carbon atoms.

13. The process of claim 1 wherein said zinc salt of an organic acid is selected from zinc stearate, zinc laurate, and zinc oleate.

14. The process of claim 1 wherein said composition comprises from about 99.95 to about 99.5 weight percent said polyester and from about 0.05 to about 1.0 weight percent said zinc salt of an organic acid.

15. The process of claim 1 wherein said composition comprises from about 99.9 to about 99.5 weight percent said polyester and from about 0.1 to about 0.5 weight percent said zinc salt of an organic acid.

16. The process of claim 1 wherein said melt is at a temperature from about 385° F. (195° C.) to 500° F. (260° C.).

17. The process of claim 1 wherein said melt is at a temperature from about 410° F. (210° C.) to 480° F. (250° C.).

18. The process of claim 1 wherein said profile is optically clear.

19. The process of claim 1 wherein said profile is tubing.

20. The process of claim 1 wherein said zinc salt of an organic acid is melt blended with a polymer base material in concentrations of about 3 to about 50 weight percent to form a concentrate and said concentrate is added to said polyester to form said composition.

21. The process of claim 20 where in said polymer base material of said concentrate is a polyolefin or a polyester.

22. A method for reducing melt fracture in a profile formed by profile extrusion comprising the steps of:
(a) combining from about 99.95 to about 98.0 weight percent amorphous or semicrystalline polyester and from about 0.05 to about 2.0 weight percent of a zinc salt of an organic acid to form a melt;
(b) extruding said melt through an orifice of a die at a temperature and a speed to form an extruded article having a shape; and
(c) thereafter quenching said extruded article to form a profile;
wherein said profile has a reduction in melt fracture as compared to a second profile made from a second melt comprising said polyester without said zinc salt of an organic acid and extruded through said orifice at said temperature and said speed.

23. The process of claim 22 wherein said polyester comprises a diacid component comprising residues of terephthalic acid, naphthalene-dicarboxylic acid, 1,4-cyclohexanedicarboxylic acid, isophthalic acid or mixtures thereof and a glycol component comprising residues of ethylene glycol, 1,4-butanediol, 1,4-cyclohexanedimethanol, diethylene glycol, polytetramethylene glycol, neopentyl glycol and mixtures thereof.

24. The process of claim 22 wherein said polyester comprises a diacid component comprising residues of at least 80 mole percent terephthalic acid based on the total dicarboxylic acids and a glycol component comprising residues of from 97 to about 5 mole percent ethylene glycol and from about 3 to about 95 mole percent 1,4-cyclohexanedimethanol.

25. The process of claim 22 wherein said polyester comprises a diacid component comprising residues of at least 80 mole percent terephthalic acid based on the dicarboxylic acids and a glycol component comprising residues of from about 50 to about 85 mole percent ethylene glycol and from about 50 to about 15 mole percent neopentyl glycol.

26. The process of claim 22 wherein said zinc salt of an organic acid is derived from carboxylic acids containing from about 8 to about 40 carbon atoms.

27. The process of claim 22 wherein said zinc salt of an organic acid is derived from unsaturated fatty acids containing from about 12 to about 22 carbon atoms.

28. The process of claim 22 wherein said zinc salt of an organic acid is selected from zinc stearate, zinc laurate, and zinc oleate.

29. The process of claim 22 wherein said composition comprises from about 99.95 to about 99.5 weight percent said polyester and from about 0.05 to about 1.0 weight percent said zinc salt of an organic acid.

30. The process of claim 23 wherein said composition comprises from about 99.9 to about 99.5 weight percent said polyester and from about 0.1 to about 0.5 weight percent said zinc salt of an organic acid.

* * * * *